US012037783B2

(12) United States Patent
Krause

(10) Patent No.: US 12,037,783 B2
(45) Date of Patent: *Jul. 16, 2024

(54) ADJUSTABLE SUPPORT SYSTEM FOR A BUILDING STRUCTURE AND A WALL STRUCTURE HAVING AN ADJUSTABLE SUPPORT SYSTEM

(71) Applicant: Advanced Architectural Products, LLC, Allegan, MI (US)

(72) Inventor: G. Matt Krause, Allegan, MI (US)

(73) Assignee: Advanced Architectural Products, LLC, Allegan, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,898

(22) Filed: Jan. 3, 2023

(65) Prior Publication Data

US 2023/0250626 A1 Aug. 10, 2023

Related U.S. Application Data

(63) Continuation of application No. 16/912,575, filed on Jun. 25, 2020, now Pat. No. 11,542,702.

(51) Int. Cl.
*E04B 1/36* (2006.01)
*E04B 1/38* (2006.01)
*E04B 1/74* (2006.01)
*F16B 2/22* (2006.01)

(52) U.S. Cl.
CPC ............... *E04B 1/36* (2013.01); *E04B 1/388* (2023.08); *E04B 1/74* (2013.01); *E04B 2001/389* (2023.08); *F16B 2/22* (2013.01)

(58) Field of Classification Search
CPC ..... E04B 1/36; E04B 1/40; E04B 1/74; E04B 1/7612; E04B 2/703; E04B 2001/388; E04B 2001/389; E04B 2001/401; E04B 2002/025; E04B 2002/462; E04B 2002/7462; F16B 2/22
USPC ................................................. 52/393, 483.1
See application file for complete search history.

(56) References Cited

U.S. PATENT DOCUMENTS 7,043,884 B2 * 5/2006 Moreno .............. E04F 13/0808
52/489.1
7,600,349 B2 * 10/2009 Liebendorfer .......... H02S 20/23
52/173.3
8,904,727 B1 * 12/2014 Hohmann, Jr. ....... E04B 1/4178
52/712

(Continued)

*Primary Examiner* — James J Buckle, Jr.
(74) *Attorney, Agent, or Firm* — The Watson IP Group, PLC; Jovan N. Jovanovic

(57) ABSTRACT

An adjustable support system has a base bracket member, a clip member, and an outer bracket. The base bracket member has a first end wall that overlays a substrate, a body wall extending outwardly therefrom and a second end wall opposite the first end wall. The clip member has a base bracket member coupling, and a projecting arm. The base bracket member coupling is attached to the first end wall and overlies a portion of the body wall. The projecting arm is spaceable apart from the body wall. The outer bracket has a spanning wall with inner and outer sides. An outer end wall extends from the outer side. The spanning wall is slidably positionable between the body wall of the base bracket member and the at least one clip member, to sandwich the same. Wall assemblies and methods are likewise disclosed.

15 Claims, 16 Drawing Sheets

(56) References Cited

U.S. PATENT DOCUMENTS

| | | | | |
|---|---|---|---|---|
| 9,085,912 B2* | 7/2015 | Brady | ............... | E04B 2/7457 |
| 9,334,646 B2* | 5/2016 | Hohmann, Jr. | ....... | E04B 1/4185 |
| 9,624,666 B2* | 4/2017 | Singleton | ............... | E04B 2/58 |
| 9,856,655 B2* | 1/2018 | Knight | ............... | E04F 13/0862 |
| 10,006,584 B2* | 6/2018 | Tremaine | ............ | F16M 11/046 |
| 10,273,686 B2* | 4/2019 | Lake | ............... | E04B 1/7612 |
| 10,480,197 B2* | 11/2019 | Hohmann, Jr. | ..... | E04F 13/0857 |
| 2005/0284053 A1* | 12/2005 | Grunewald | ............ | E04B 2/96 |
| | | | | 52/235 |
| 2013/0174506 A1* | 7/2013 | Bombino | ............ | E04B 1/388 |
| | | | | 52/750 |
| 2014/0325928 A1* | 11/2014 | White | ............... | F25D 23/085 |
| | | | | 52/506.05 |

* cited by examiner

ADJUSTABLE SUPPORT SYSTEM FOR A BUILDING STRUCTURE AND A WALL STRUCTURE HAVING AN ADJUSTABLE SUPPORT SYSTEM

CROSS-REFERENCE TO RELATED APPLICATION

The present application is a continuation of U.S. patent application Ser. No. 16/912,575 filed on Jun. 25, 2020, entitled "ADJUSTABLE SUPPORT SYSTEM FOR A BUILDING STRUCTURE AND A WALL STRUCTURE HAVING AN ADJUSTABLE SUPPORT SYSTEM", the entire specification of which is hereby incorporated by reference in its entirety.

BACKGROUND OF THE DISCLOSURE

1. Field of the Disclosure

The disclosure relates in general to building structures, and more particularly, to an adjustable support system for building walls.

2. Background Art

With the cost of energy ever increasing, addressing building thermal losses has become more and more important. In building assembly, cladding and insulation are applied to the outside of a building substrate. Thermal isolation of the cladding from the substrate has increasing been a focus due to the large thermal losses due to heat conduction between the cladding and the building substrate.

While there have been advances in thermal protection and insulation, there are typically connectors and structural members between the substrate and the cladding which have exhibit high thermal conductivity. For example, many such structures have continuous metal portions that form a path between the substrate and the cladding. Many thermal losses are attributed to this highly thermally conductive conduit.

Additionally, and somewhat separately, in many instances, the outer surface of the building substrate is uneven or has imperfections. It is desired to correct these imperfections when applying the cladding sot that the cladding is both uniform and generally free of undulations, and imperfections. Often, undulations in cladding, are unsightly, and can contribute to deterioration of the cladding which can then compromise the insulation and other structures.

As such, providing structures which have high thermal insulative properties while also correcting for imperfections, undulations and other problems associated with building substrates so that cladding can be uniformly installed is highly desirable.

SUMMARY OF THE DISCLOSURE

The disclosure is directed an adjustable support system comprising a base bracket member, at least one clip member, and an outer bracket. The base bracket member has a first end wall structurally configured to overly a substrate, a body wall extending outwardly from the first end wall and a second end wall opposite the first end wall. The at least one clip member has a base bracket member coupling, and a projecting arm. The base bracket member coupling is attached to the first end wall and overlies a portion of the body wall. The projecting arm is spaceable apart from the body wall of the base bracket member. The outer bracket comprises a spanning wall with an inner side and an outer side. An outer end wall extends from the outer side of the outer bracket. The spanning wall of the outer bracket is slidably positionable between the body wall of the base bracket member and the at least one clip member. As such, the body wall and the at least one clip member sandwich the spanning wall therebetween.

In some configurations, the system further comprises at least one fastener coupling the spanning wall to the body wall.

In some configurations, the projecting arm of the at least one clip member is biased against the spanning wall to force the spanning wall against the body wall.

In some configurations, the first end wall includes a base mounting member positioned so as to overly the first end wall on a side opposite a facing side of the first end wall.

In some configurations, the first end wall further includes a channel disposed on an outward side thereof, with the base mounting member being slidably positionable therealong.

In some configurations, the base bracket member coupling of the at least one clip member is slidably positioned within the channel of the first end wall so as to abut the base mounting member.

In some configurations, the at least one clip member comprises a pair of clip members. A clip member is slidably positioned within the channel of the first end wall on opposite sides of the base mounting member.

In some configurations, a distal mounting member overlies at least a portion of at least one of the second end wall and the body wall.

In some configurations, the distal mounting member overlies an inward side of the second end wall and the body wall.

In some configurations, the second end wall includes a channel, with the distal mounting member having a distal slot engaging member slidably positionable within the channel, and a support arm overlying a portion of the body wall.

In some configurations, the body wall is substantially perpendicular to the second end wall. The distal slot engaging member is substantially perpendicular to the support arm.

In some configurations, the base bracket member comprises a polymer with fiber reinforcement. The distal mounting member comprises a metal or alloy thereof.

In some configurations, the system further comprises a distal coupling member overlying an inner surface of the outer end wall.

In some configurations, the outer end wall further includes a channel disposed on the inner surface thereof. The distal coupling member is slidably insertable within the channel.

In some configurations, the distal coupling member comprises a metal or alloy thereof.

In come configurations, assembly, the outer end wall overlies the second end wall, while being distally spaced therefrom.

In some configurations, the outer bracket is positionable relative to the base bracket member so that the outer end wall and the second end wall are oblique relative to each other, while the spanning wall and the body wall are parallel to each other.

In another aspect of the disclosure, the disclosure is directed to a wall. The wall comprises a substrate, a first base bracket system assembly, a second base bracket assembly, and at least one outer bracket. The substrate has an outer surface. The first base bracket system assembly and the second base bracket assembly each have a base bracket member and at least one clip member. The base bracket member has a first end wall, a body wall extending from the first end wall and a second end wall opposite the first end wall. Each of the at least one clip members are attached to the first end wall and overlie a portion of the body wall. The at least one outer bracket member has a spanning wall and an outer end wall. The spanning wall of the at least one outer bracket is slidably positionable between the base bracket member and the at least one clip of at least one of the first base bracket system and the second base bracket system and fastened thereto. Additionally, the first end wall of the base bracket member is attached to the substrate. Further, a cladding is attached to the second end wall opposite the substrate.

In some configurations, the wall further comprises insulation positioned between the substrate and the cladding.

In yet another aspect of the disclosure, the disclosure is directed to a method of assembling an adjustable support system comprising the steps of: providing a base bracket system assembly, the base bracket system assembly comprising: a base bracket member with a first end wall, a body wall extending from the first end wall and a second end wall opposite the first end wall; at least one clip member attached to the first end wall and overlying a portion of the body wall; providing an outer bracket member having a spanning wall and an outer end wall; slidably positioning the spanning wall between the body wall and the at least one clip member, so that the at least one clip member and the body wall sandwich the spanning wall therebetween; and coupling the spanning wall to the body wall after the step of slidably positioning.

Other systems and methods are likewise contemplated, including the formation of a wall comprising a plurality of base bracket system assemblies and outer brackets that cooperatively are coupled to a wall substrate, with a cladding assembly attached to the outer brackets.

BRIEF DESCRIPTION OF THE DRAWINGS

The disclosure will now be described with reference to the drawings wherein.

DETAILED DESCRIPTION OF THE DISCLOSURE

Figure 1:
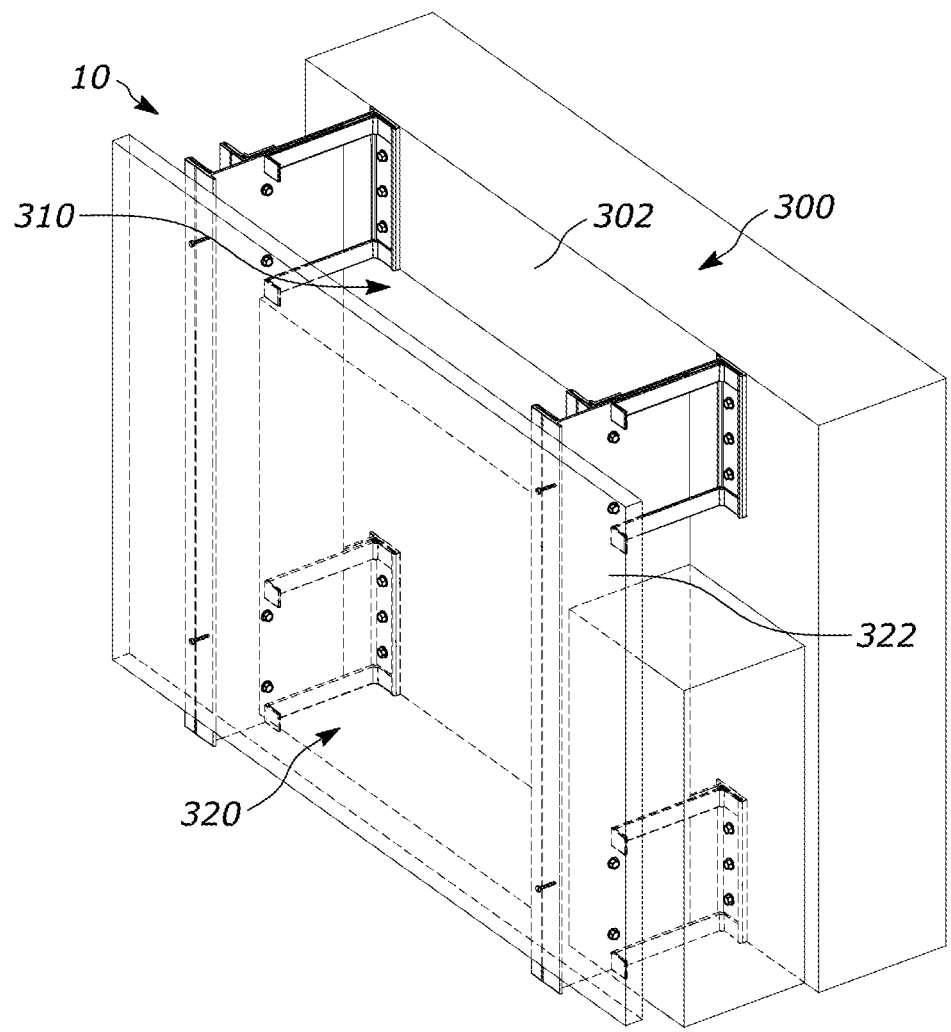
FIG. 1 of the drawings is a perspective view of a wall having the adjustable wall system of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
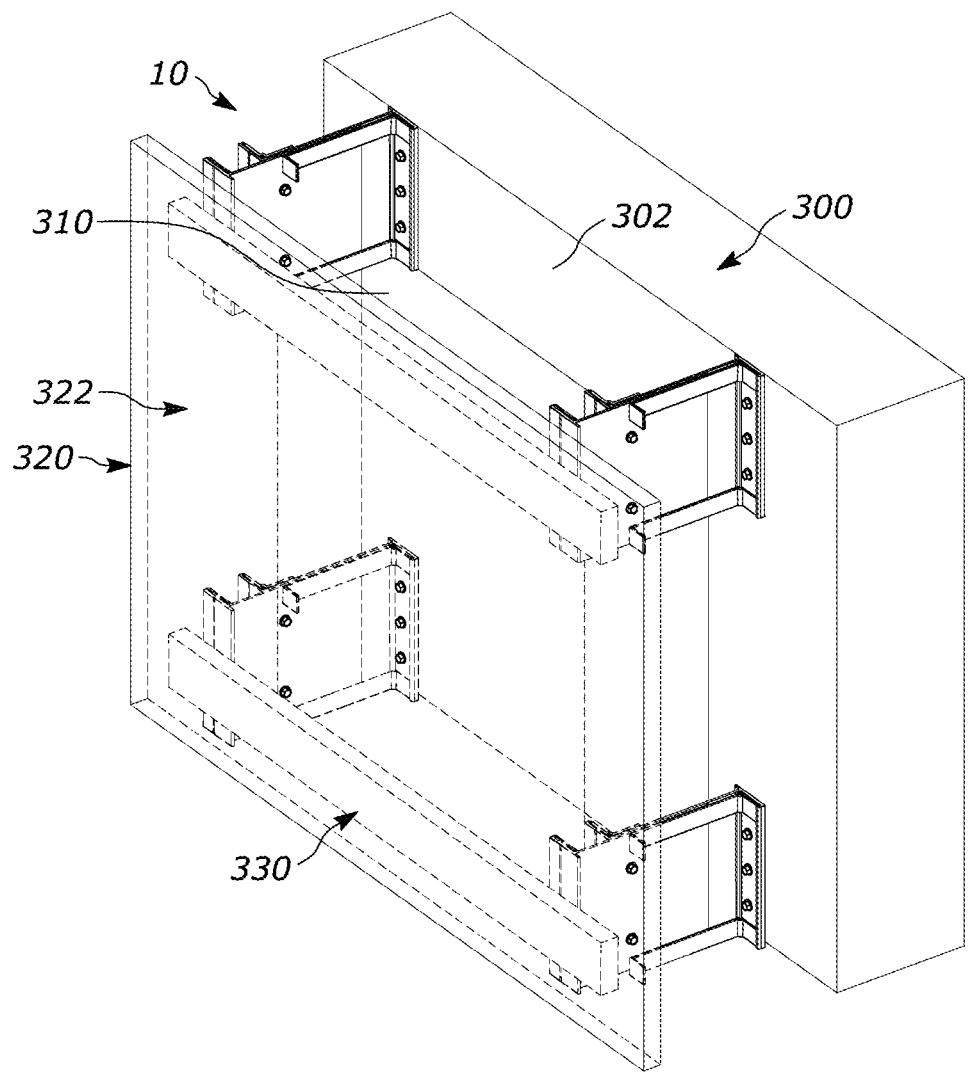
FIG. 2 of the drawings is a perspective view of a wall having the adjustable wall system of the present disclosure.

Referring now to the drawings and in particular to FIGS. 1 and 2, the adjustable support system is shown generally at 10. The adjustable support system 10 forms a structure between substrate 300 and cladding assembly 320. The substrate may comprise a wall surface which is attached to a plurality of wall studs or the like (wood, metal or composite, for example, and without limitation). Alternatively, the substrate may comprise a concrete or block wall. Of course, other substrates are likewise contemplated. The substrate includes an outer surface 302. Typically, such an outer surface may be planar, may include surface imperfections, surface variations as well as a plurality of different surfaces.

The cladding assembly 320 includes cladding sheet 322 which may be attached to the adjustable support system opposite the substrate. In some configurations, rails, such as rails 330 may extend between adjacent portions of the adjustable support system and the cladding sheet. A number of different cladding materials are contemplated for use, including, but not limited to metal sheeting (flat, corrugated or otherwise), siding, composite sheet material, fiberboard, just to name a few. The adjustable support system is not limited to any particular substrate or cladding, and the foregoing is merely exemplary.

The adjustable support system 10 as is shown in FIGS. 3-5 and 7 comprises base bracket member 14, base mounting member 16, clip member 18, distal mounting member 20, outer bracket 22, distal coupling member 24, base fasteners 26 and bracket fasteners 28. The assembled base bracket member, base mounting member, clip member, and distal mounting member collectively define a base bracket system assembly.

Figure 6:
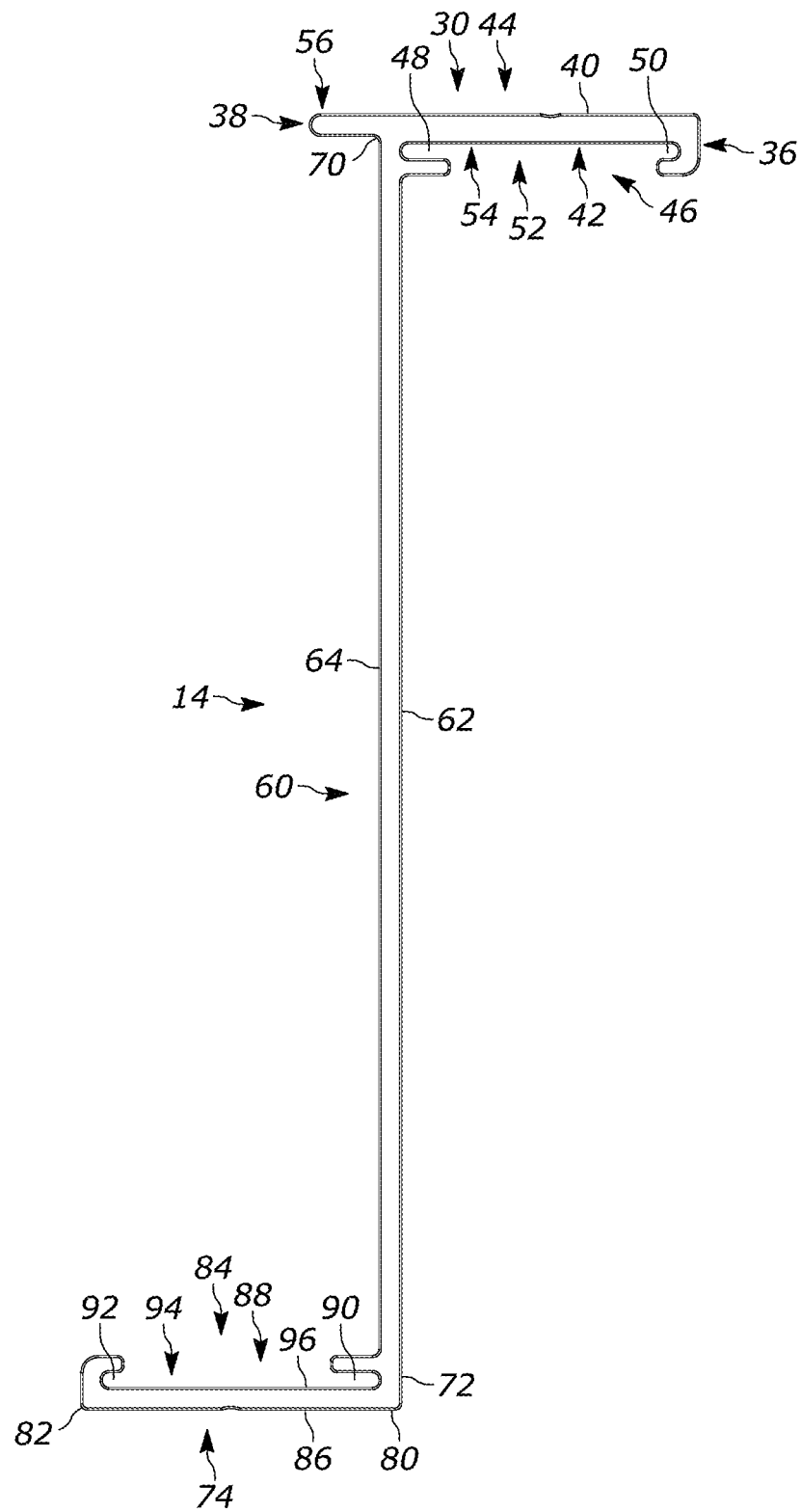
FIG. 6 of the drawings is a side elevational view of the base bracket member of the present disclosure.
Figure 7:
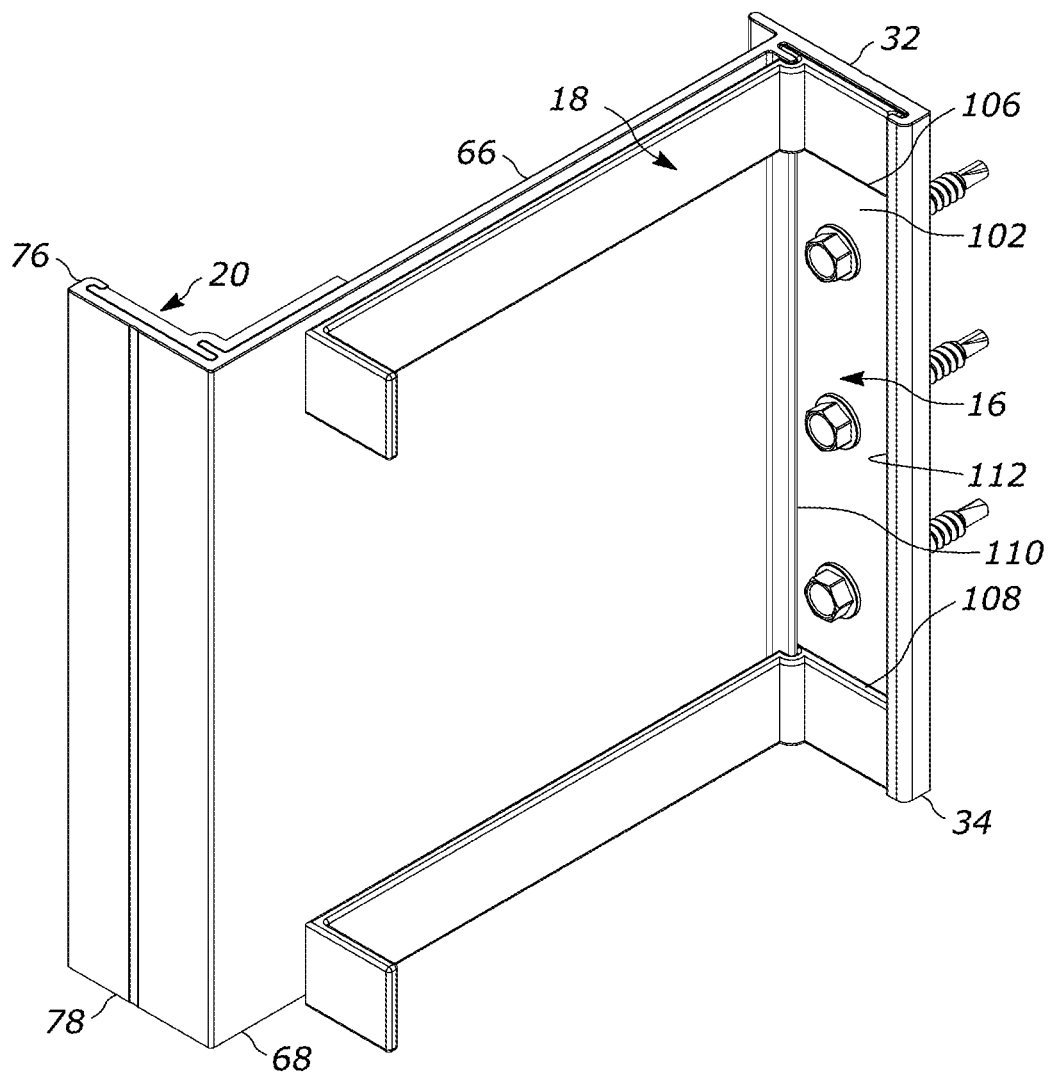
FIG. 7 of the drawings is a perspective view of the base bracket member of the present disclosure, with the base mounting member, the clip member and the distal mounting member coupled thereto.

The base bracket member 14 is shown in FIGS. 6 and 7 as comprising first end wall 30, body wall 60 and second wall 74. The base member may comprise a polymer and fiber composite based material that may be pultruded. One such configuration is disclosed in U.S. Pat. No. 8,826,620 issued to Krause, the entire specification of which is hereby incorporated by reference in its entirety. Of course, other configurations are contemplated as well, including other configurations of the present assignee, among others. It will be understood therefore, that the cross-sectional configuration of the base bracket member is substantially uniform along the length thereof, preferably, as the formation is completed by pultrusion through a pultrusion die. It will be understood that variations may be formed along the length of the base bracket member. It is additionally contemplated, and as will be explained below, a multitude of the base bracket members can be utilized in a single installation, and also to cooperate with a single outer bracket.

In the configuration shown, the first end wall 30 includes top edge 32, bottom edge 34, first side edge 36, second side edge 38. The first end wall 30 includes facing side 40 and outward side 42 opposite the facing side 40. In the configuration shown, the facing side overlies the substrate. The first end wall comprises a first leg region 44 extending one direction from the body wall and a second leg region 56 extending in the opposite direction from the body wall. In the configuration shown, the width of the first leg region is larger than the width of the second leg region, while variations are contemplated. In the configuration shown, the first leg region and the second leg region define the substantially planar facing side 40.

A channel 46 is defined on the outward side 42 of the first leg region 44. The channel 46 includes first side slot 48 and a second side slot 50 opposite the first side slot, with a central opening 52 therebetween exposing the base 54 between the first side slot and the second side slot. In the configuration shown, the first side slot and the second side slot are generally mirror images of each other about a line that extends along the longitudinal axis of the channel 46. It will be understood and explained below that the channel is configured to receive the base mounting member 16 and the clip member 18 in mating engagement. It is contemplated which include tab-like features that extend into the first side slot and the second side slot. In other configurations, the first end wall 30 may include tab-like features with the base mounting member 16 and the clip member 18 comprising slot like features for mating slidable engagement. In still other configurations, the outward side 42 may comprise a planar structure, with structures adhered or otherwise coupled thereto.

The body wall 60 extends from the first end wall, and generally defines the delineation between the first leg region 44 and second leg region 56. In the configuration shown, the body wall is generally perpendicular to the first end wall and includes first side 62 and second side 64 defining a thickness. The perimeter is typically defined by the top edge 66, bottom edge 68, inner edge 70 and outer edge 72.

The second end wall 74 is positioned at the outer edge 72 of the body wall opposite the first end wall 30. The second wall is generally defined by the top edge 76, bottom edge 78, first side edge 80 and second side edge 82.

The second end wall 74 further includes an inward side 84 and a cladding side 86. The inward side generally faces toward the substrate of the building, with the cladding side facing the cladding (while variations are contemplated, and the term cladding side is not to be deemed limiting as to contact with, facing or otherwise being associated with the cladding side). In the configuration shown, the second end wall is parallel with the first end wall and perpendicular to the body wall. Variations, however, are contemplated where the walls may be oblique to each other.

The inward side 84 includes first side slot 90, second side slot 92 opposite the first side slot 90, which is spaced apart by base 96 opposite of which is central opening 94. The configuration of the inward side is much like the channel of the first leg region of the first end wall. In the configuration shown, the second end wall meets the body wall at the first side edge of the second end wall so that the second end wall terminates at the body wall. Additionally, in the configuration shown, the second end wall extends in the same direction as the second leg region of the base bracket member, and opposite of the first leg region.

The base mounting member 16 is shown in FIG. 7 as comprising elongated bar member 100 that is positioned within the channel 46 of the first end wall. Due to the configuration of the channel, the base mounting member is configured to be slidably positionable therein, and includes upper surface 102, lower surface 104, first end 106, second end 108, first slot edge 110 and second slot edge 112. In the configuration shown, the clip members 18 are likewise positioned within the channel 46 so that the length of the elongated bar member and the pair of clip members generally matches the length of the base bracket member. It will be understood that the elongated bar member may comprise a single member or multiple members that are positioned in an end to end configuration. Furthermore, it is contemplated that the elongated bar member may comprise a substantially rectangular configuration of uniform thickness. Variations are contemplated to the size and shape thereof, as will be understood by one of skill in the art. Furthermore, the elongated bar member may include a plurality of openings or may include indentations or other markings to identify appropriate regions for the extension of fasteners therethrough.

Figure 8:
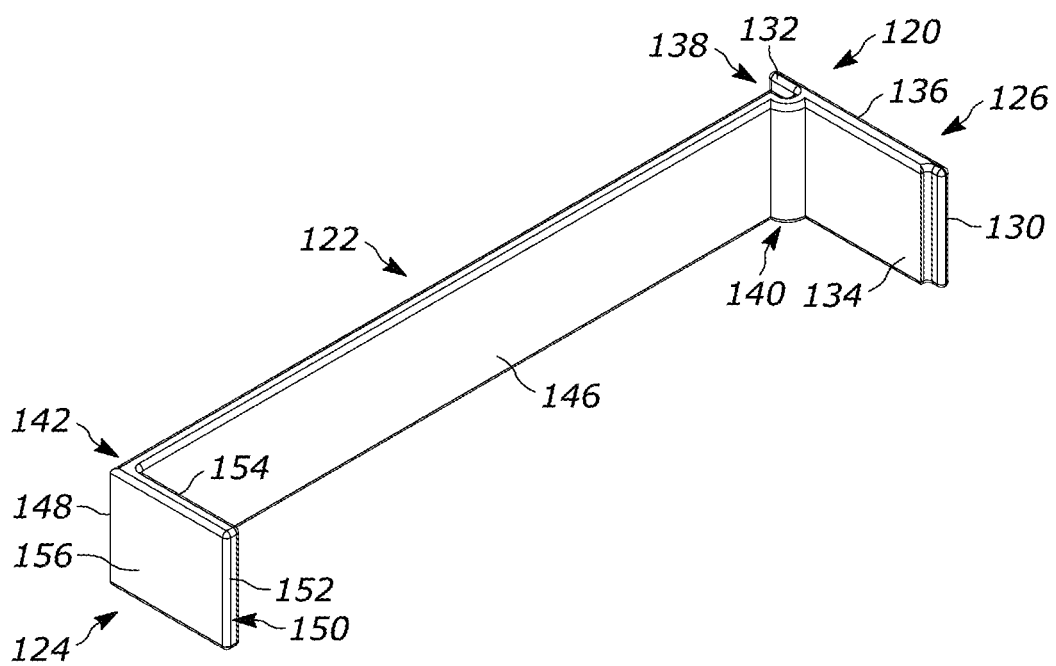
FIG. 8 of the drawings is a first side perspective view of the clip member of the present disclosure.
Figure 9:
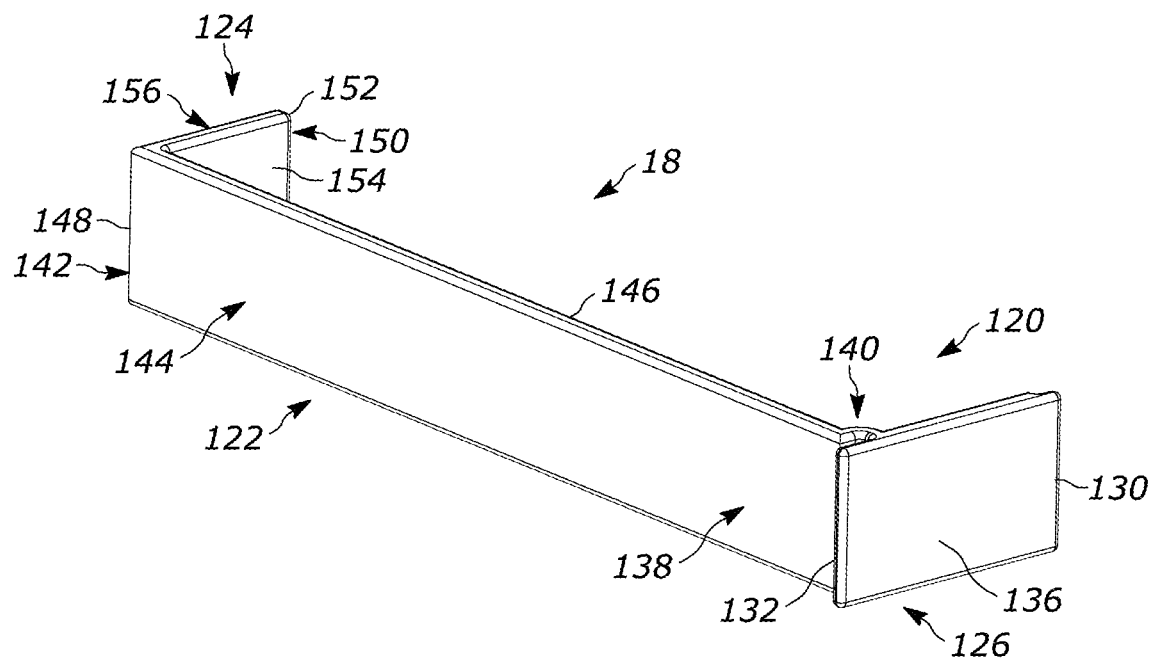
FIG. 9 of the drawings is a second side perspective view of the clip member of the present disclosure.

The clip member 18 is shown in FIGS. 8 and 9 (and assembled in FIG. 7) as comprising base bracket member coupling 120, projecting arm 122 and distal flange 124. The base bracket member coupling 120 and the distal flange are generally perpendicular to each other with the projecting arm being oblique to each or perpendicular to each. In certain configurations, the distal flange 124 and the projecting arm 122 may be perpendicular to each other with the base bracket member coupling being oblique to each so that the projecting arm is inclined toward the body wall 60 of the base bracket member when installed, so as to provide a biasing force against the distal mounting member toward the body wall of the base bracket member 14. While two clip members are shown, it is contemplated that a single clip member, or in excess of three clip members may be utilized (without limitation).

The base bracket member coupling 120 includes slot engaging member 126 which includes first slot side 130, second slot side 132, upper surface 134 and lower surface 136. As will be explained below in greater detail the slot engaging member slidably positionable and movable within the channel of the first end wall of the base bracket member.

The projecting arm 122 extends from the base bracket member coupling 120 at the proximal end 138 (coupling through the notch 140) to distal end 142, and include inner surface 144 that generally faces the body wall 60 and outer surface 146 opposes the inner surface 144. In the configuration shown, the projecting arm 122 comprises a substantially planar configuration, and of substantially uniform thickness, while variations are contemplated. In the configuration shown, the notch 140 facilitates the projecting arm 122 to be positioned closer to the body wall than would otherwise be possible due to the configuration of the first side slot 48 of the first end wall.

The distal flange 124 is shown in FIG. 1 as comprising proximal end 148, distal end 150, with an inner surface 154 and an outer surface 156 opposite the inner surface. The distal flange is generally oblique or perpendicular to the projecting arm, and substantially planar. In the configuration shown, the distal flange is of substantially uniform cross-sectional configuration. The distal flange terminates at a distal edge 152, which, as explained is positioned so as to interface with insulation or the like.

In the configuration shown, the projecting arm is longer than either one of the base bracket member coupling or the distal flange, with the distal flange being shorter than the base bracket member. As will be explained in greater detail below, the projecting arm is shorter than the width of the body wall so that the distal end of the projecting arm is spaced apart from the outer edge of the body wall. It is contemplated that the clip member may comprise a polymer and fiber composite member which is likewise pultruded. As such, the cross-sectional configuration may be substantially uniform as a result of such pultrusion, while molded polymer members are likewise contemplated. In other configurations, the member may be formed from a metal or alloy thereof through a stamping, casting or forging process.

Figure 10:
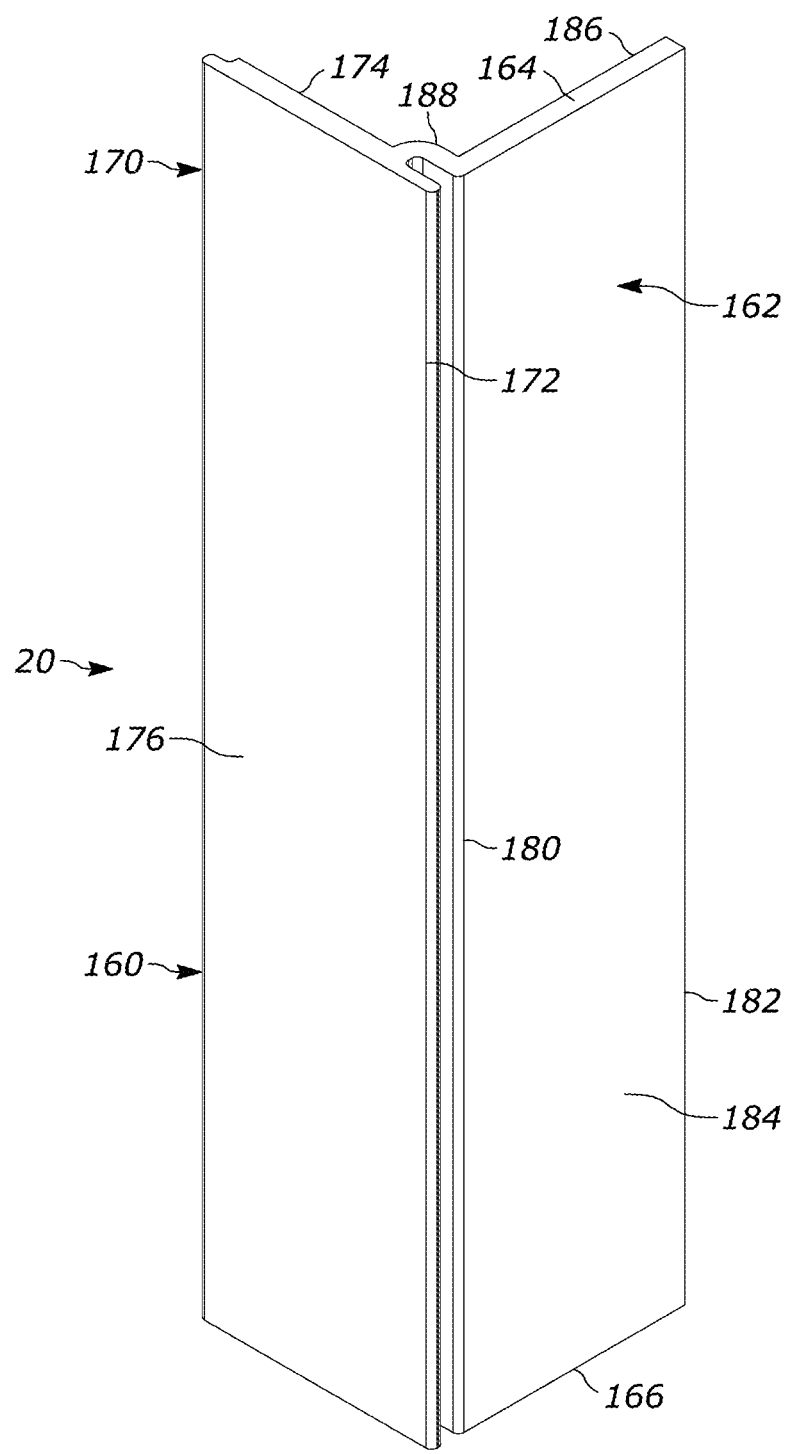
FIG. 10 of the drawings is a perspective view of the distal mounting member of the present disclosure.
Figure 11:
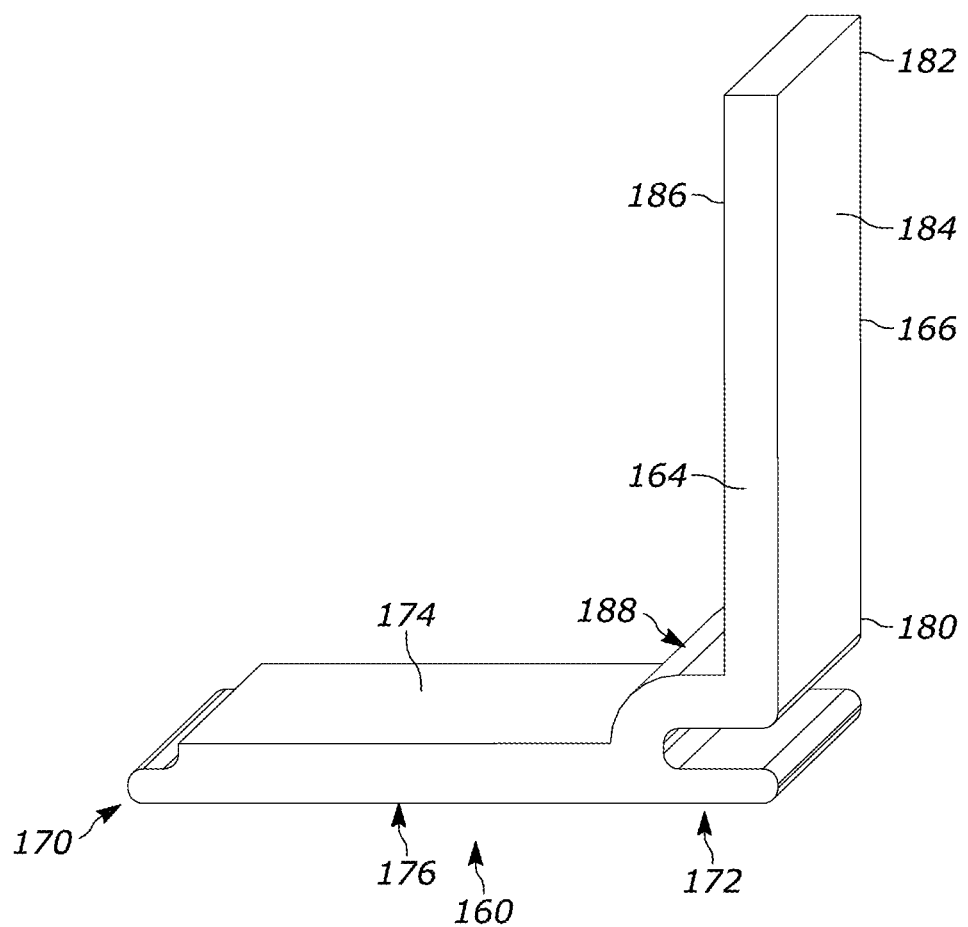
FIG. 11 of the drawings is a perspective view of the distal mounting member of the present disclosure.

The distal mounting member 20 is shown in FIGS. 10 and 11 (and in FIGS. 5 and 7 assembled) as comprising distal slot engaging member 160 and support arm 162. In the configuration shown, the distal mounting member comprises a substantially uniform member (which may be formed through an extrusion of a metal or alloy thereof, while not being limited thereto). The distal mounting member extends from first end 164 to second end 166. In the configuration shown, the distal mounting member has a length that generally corresponds to the base bracket member. Of course, other configurations are likewise contemplated.

The distal slot engaging member 160 of the distal mounting member includes first slot side 172, second slot side 172, upper surface 174 and lower surface 176. As will be understood and explained in greater detail below, the distal slot engaging member is slidably positionable within the channel 88 of the second end wall 74, so as to be slidably movable therewithin. The support arm 162 extends from the distal slot engaging member so as to be positioned along the second side of the body wall, and includes proximal end 180, distal end 182, inner surface 184 and outer surface 186. The proximal end includes notch 188 which facilitates the attachment of the support arm to the distal slot engaging member around the side slot of the channel. The inner surface 184 abuttingly overlies the second side 64 of the body wall 60. As will be explained, the distal mounting member provides additional stability to the fasteners 28 that couple the base bracket member to the outer bracket.

In other configurations, it will be understood that the distal slot engaging member may comprise a pair of members, one of which is positioned on the inward side of the second end wall in overlying fashion with the second end wall and a separate member which is positioned in overlying fashion over the second side of the body wall. In still other configurations, it is contemplated that the distal mounting member may comprise a single member that is adhered or otherwise placed in such an overlying configuration. In still other configurations, the distal mounting member may be molded (or pultruded, or otherwise incorporated) into the construction of the second end of the base bracket member.

Similarly, the base mounting member may similarly be molded (or otherwise) into the construction of the first end of the bracket member. That is, the configuration and mating of the base mounting member and the distal mounting member may share commonality in construction (while variations and differences are likewise contemplated).

Figure 12:
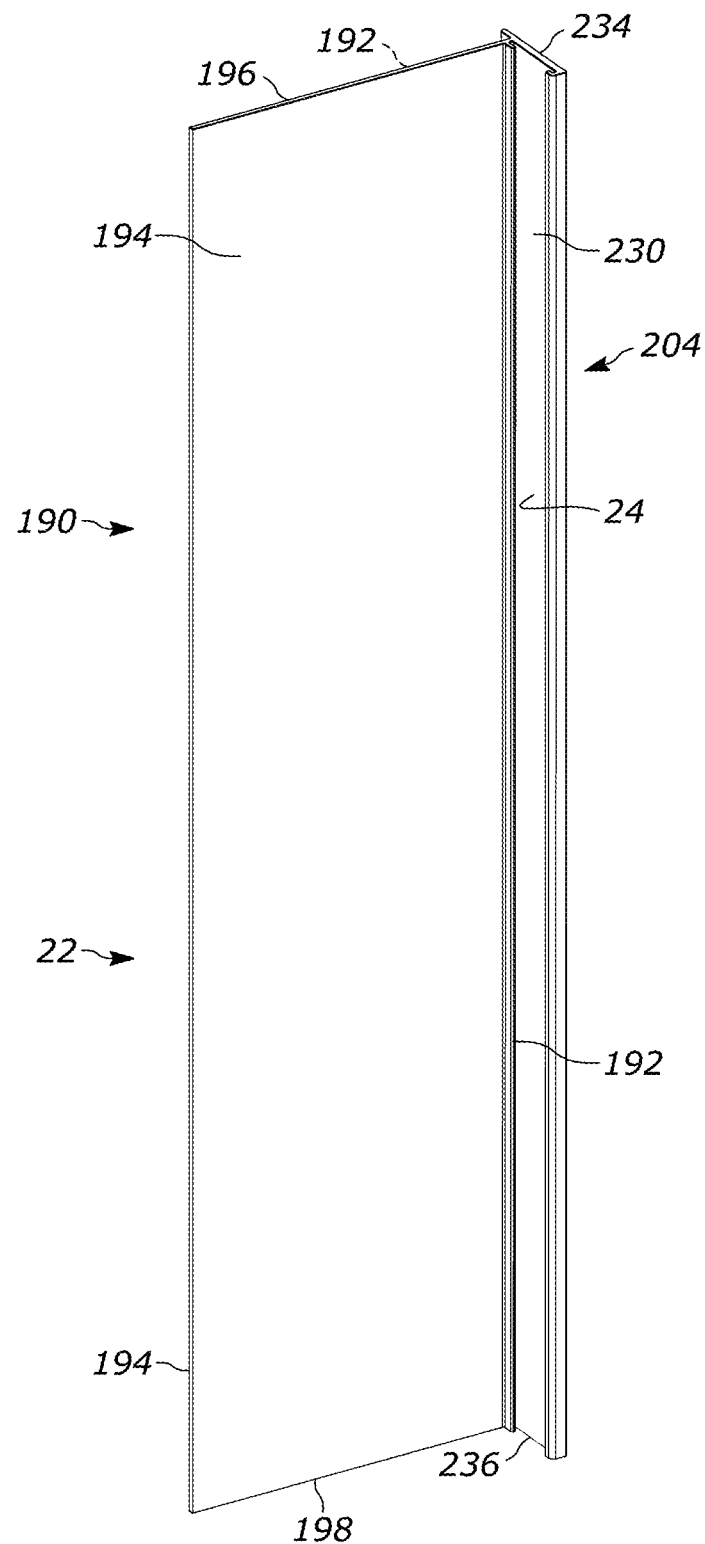
FIG. 12 of the drawings is a perspective view of the outer bracket having the distal coupling member coupled thereto.
Figure 13:
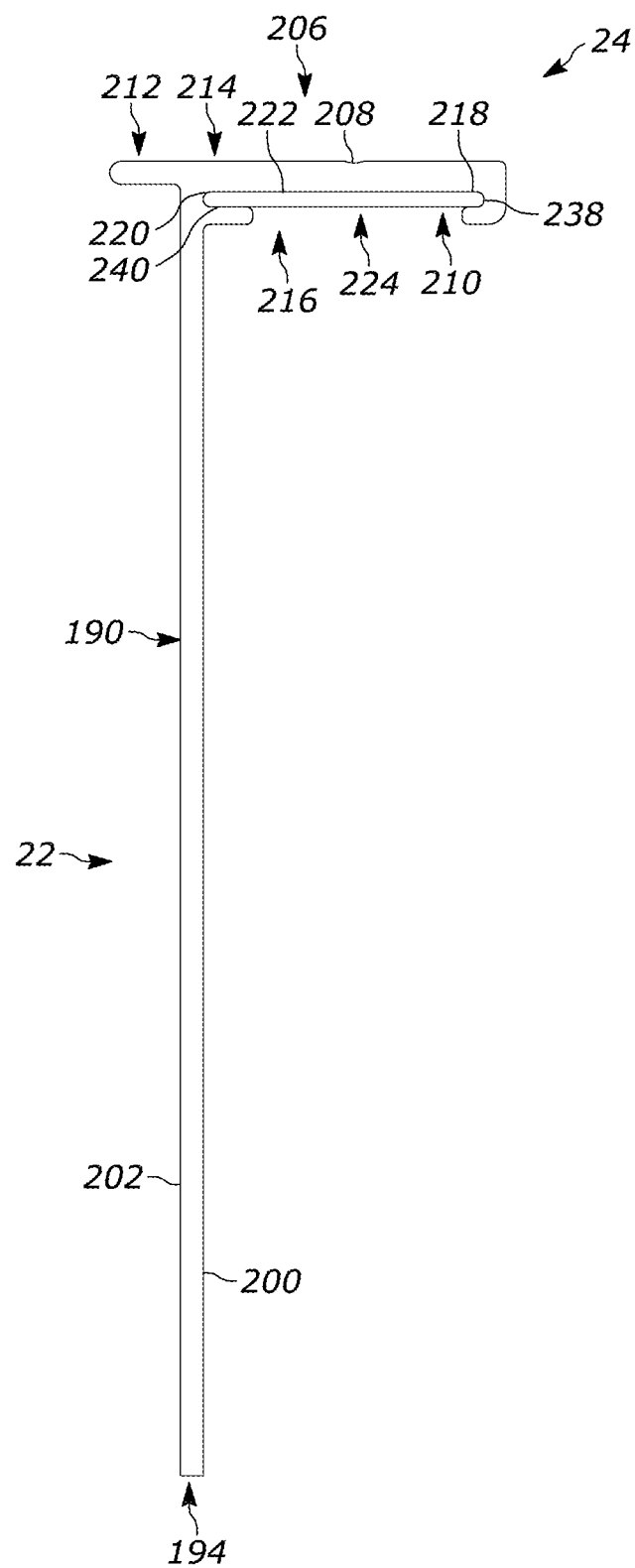
FIG. 13 of the drawings is a side elevational view of the outer bracket having the distal coupling member coupled thereto.
Figure 14:
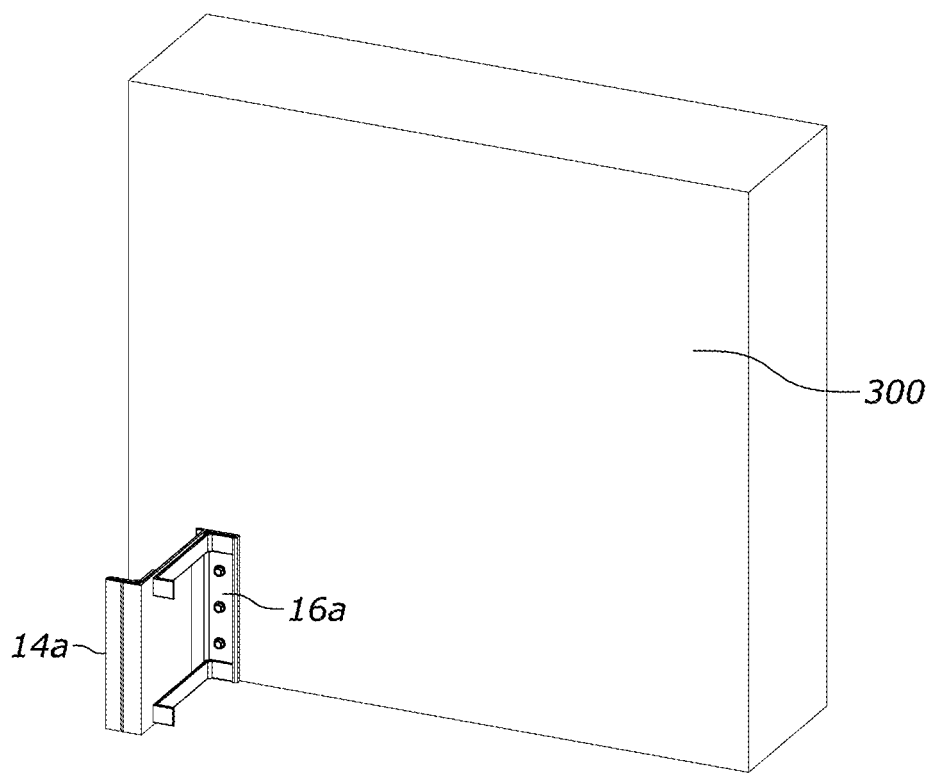
FIG. 14 of the drawings is a perspective view of an exemplary installation of the adjustable wall system of the present disclosure to form a wall.
Figure 15:
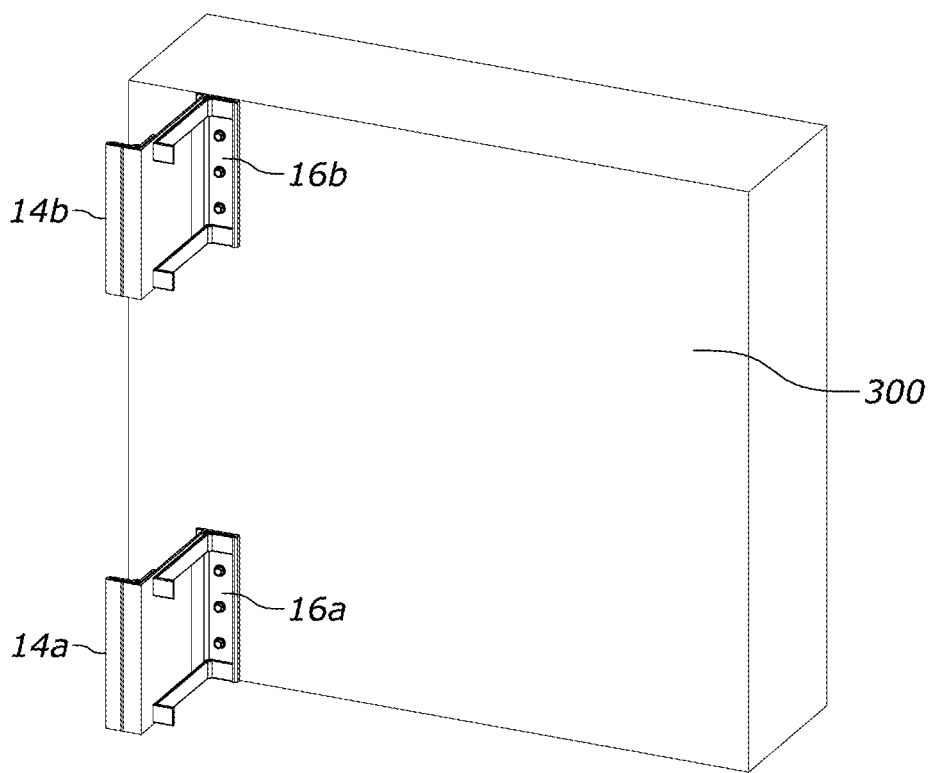
FIG. 15 of the drawings is a perspective view of an exemplary installation of the adjustable wall system of the present disclosure to form a wall.
Figure 16:
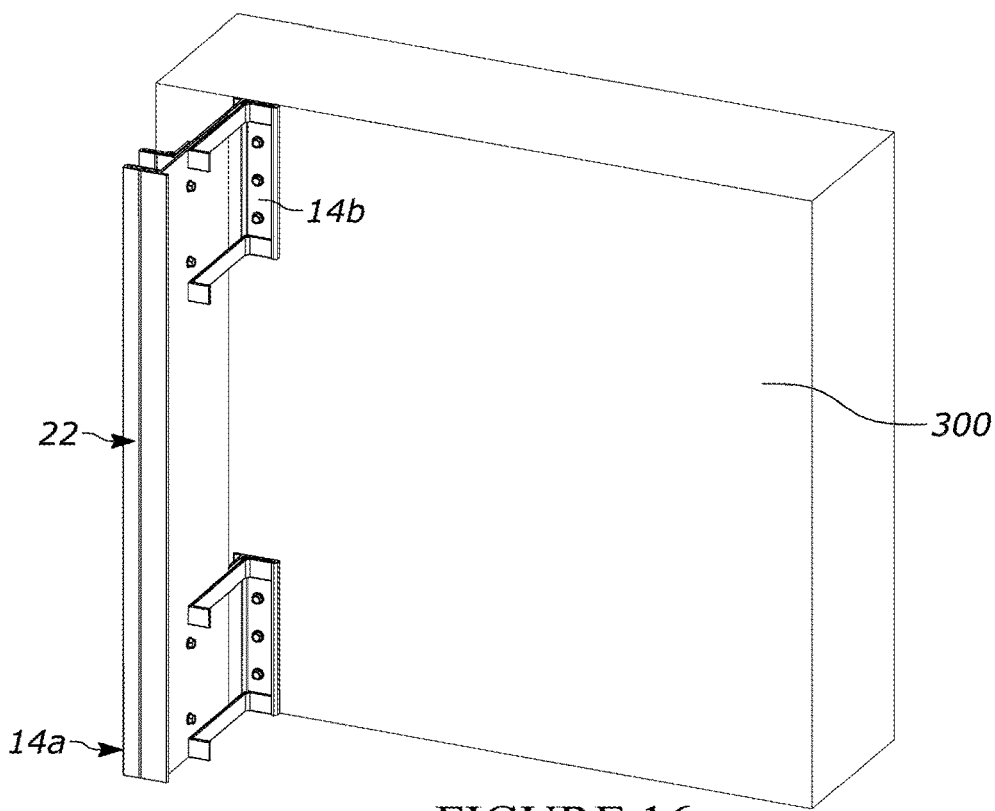
FIG. 16 of the drawings is a perspective view of an exemplary installation of the adjustable wall system of the present disclosure to form a wall.
Figure 17:
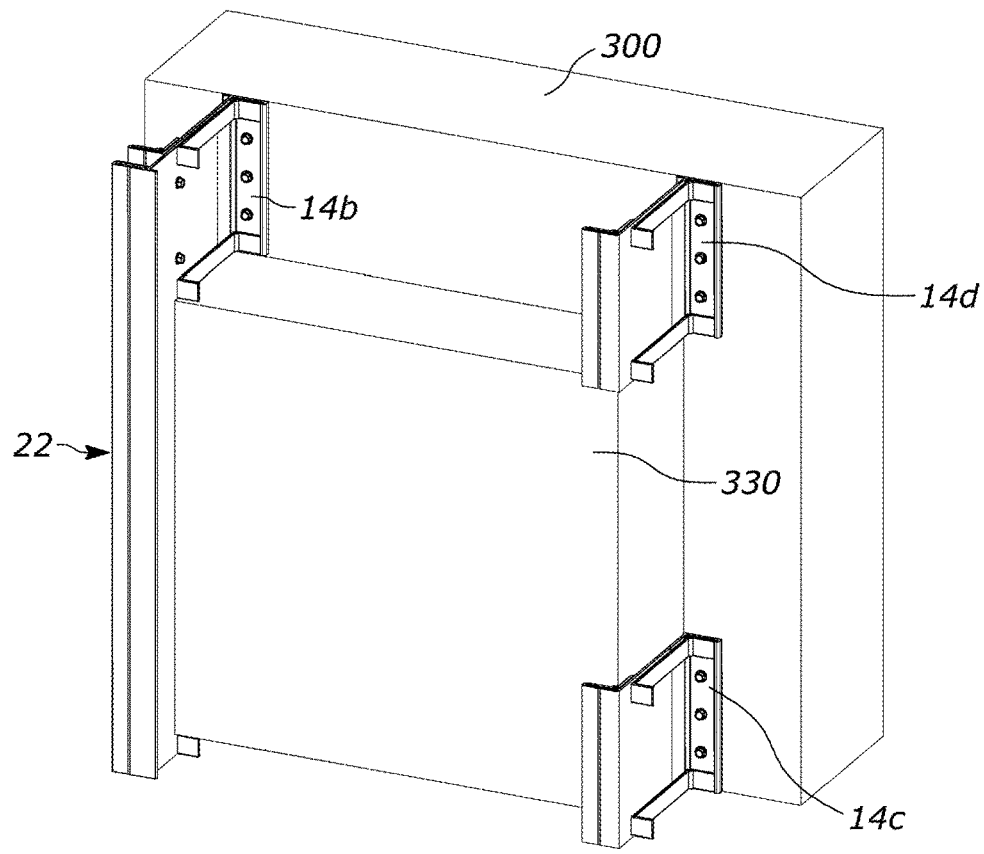
FIG. 17 of the drawings is a perspective view of an exemplary installation of the adjustable wall system of the present disclosure to form a wall.
Figure 18:
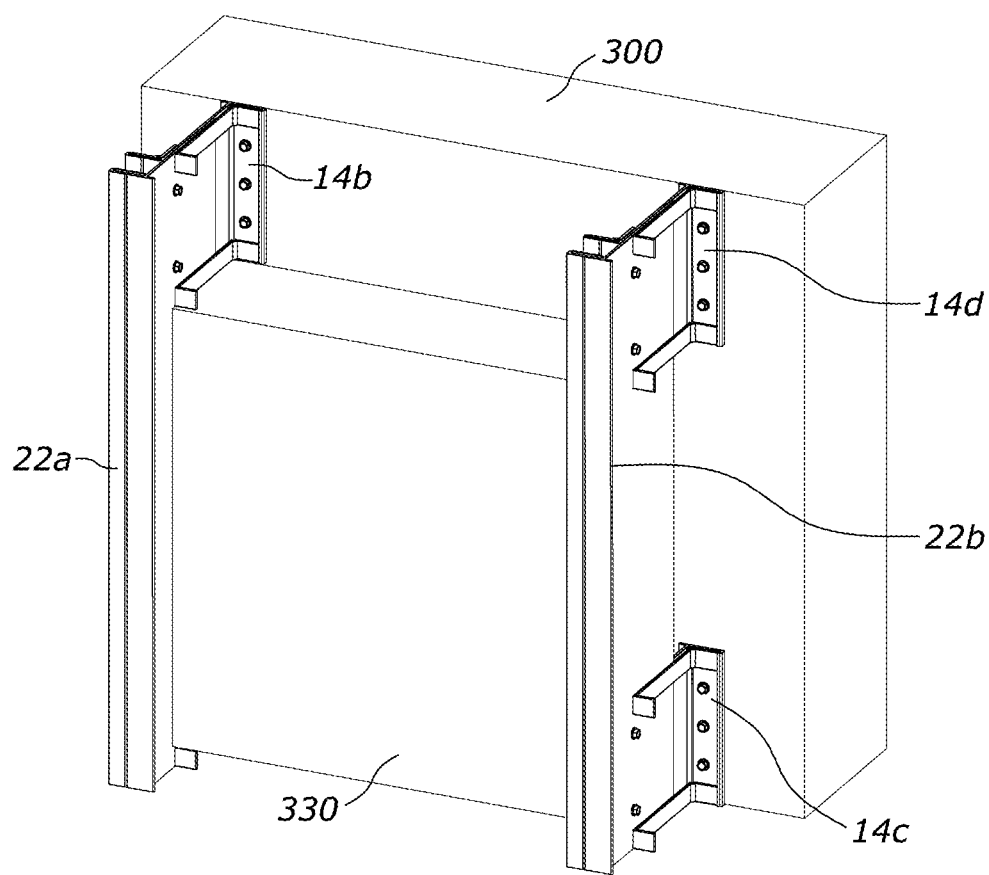
FIG. 18 of the drawings is a perspective view of an exemplary installation of the adjustable wall system of the present disclosure to form a wall.

The outer bracket 22 is shown in FIGS. 12 and 13 as comprising spanning wall 190 and outer end wall 204. It is contemplated that the outer wall comprises a polymer and fiber based composite that is pultruded or otherwise formed. In other configurations, it is contemplated that the outer bracket may comprise a metal member. In the instance of a metal member, the distal coupling member can be eliminated. Additionally, the channel 216 cna be omitted in the outer end wall. In such a configuration, the metal member may comprise a single sheet material that includes a substantially right angle bend to form the spanning wall and the outer end wall.

The spanning wall 190 includes outer side 192 and inner side 194. The outer bracket is further defined by the upper edge 196, the lower edge 198, the inner surface 200 and the outer surface 202. The spanning wall 190 is substantially uniform in thickness and may comprise a substantially planar sheet like configuration. As explained above, and as will further be detailed below, the outer bracket may be larger than the base bracket member, and may span and be coupled to multiple base brackets.

The outer end wall includes outer surface 206 and inner surface 210. The outer surface my include outer longitudinal notch 208 (or other indicative structure) which provides a visual indication as to a location wherein fasteners can be extended. Other demarcations and the like are likewise contemplated. The outer end wall further includes a first leg region and a second leg region. The construction is similar to that of the first end wall 30 of the base bracket member 14, and the various different structures therein are disclosed with the outer end wall, as well as variations thereto. The second leg region 214 of the outer end wall 204 includes channel 216 that has first side slot 218, second side slot 220 opposite thereof, base 224 therebetween with central opening 222 opposite the base 224.

The distal coupling member, which is slidably positionable within the channel 216 includes an elongated member that has upper surface 230, lower surface 232, first end 234, second end 236, first slot edge 238, and second slot edge 240. As with the base mounting member, it is contemplated that the distal coupling member similarly comprises a single uniform member, with a substantially uniform cross-sectional configuration. Preferably, the distal coupling member (like the base mounting member) is formed of a metal member or an alloy thereof, while other materials are contemplated. Additionally, a number of different structures and configurations of mating engagement are contemplated. That is, in some configurations, the distal coupling member, like the base mounting member and, to some extent, the distal mounting member, a number of variations are contemplated with the manner of overlying attachment with the respective wall of the base bracket member and the outer bracket. In some configurations, the coupling member may be adhered to the outer end wall of the outer bracket, for example. In still other configurations, the two may be in overlying engagement and secured by fasteners that are configured to retain the cladding assembly. As will be understood with any such supporting members coupled to the base bracket member or to the outer bracket, the overlying engagement may rely on mechanical coupling, including but not limited to the structure disclosed, or a negative thereof, as well as to adhesive type coupling. In still further configurations, small fasteners, such as screws or bolts, or hook and loop type fasteners are contemplated for coupling these together. Advantageously, the mechanical coupling disclosed and many that are envisioned, facilitate retention thereof while forming openings and driving fasteners therethrough.

Figure 3:
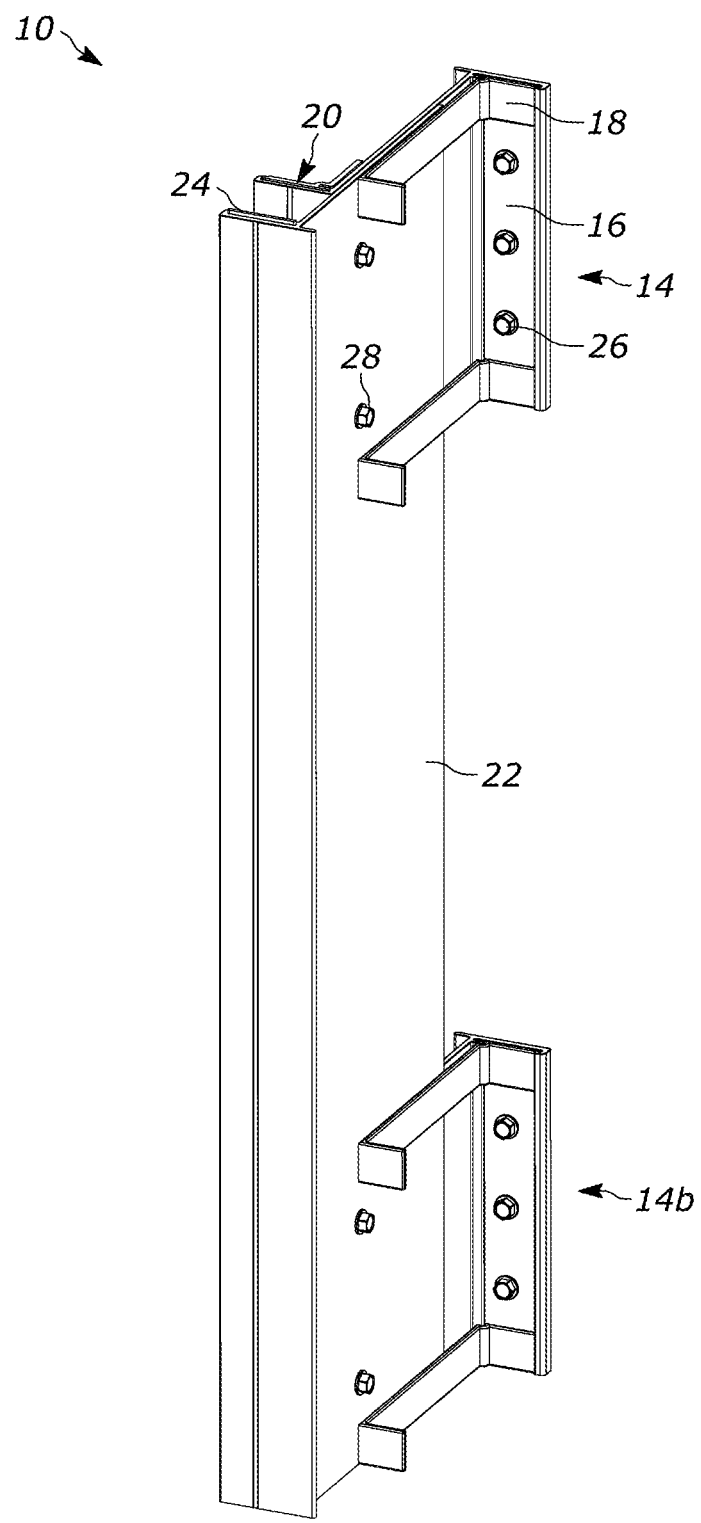
FIG. 3 of the drawings is a front perspective view of an adjustable support system of the present disclosure.
Figure 4:
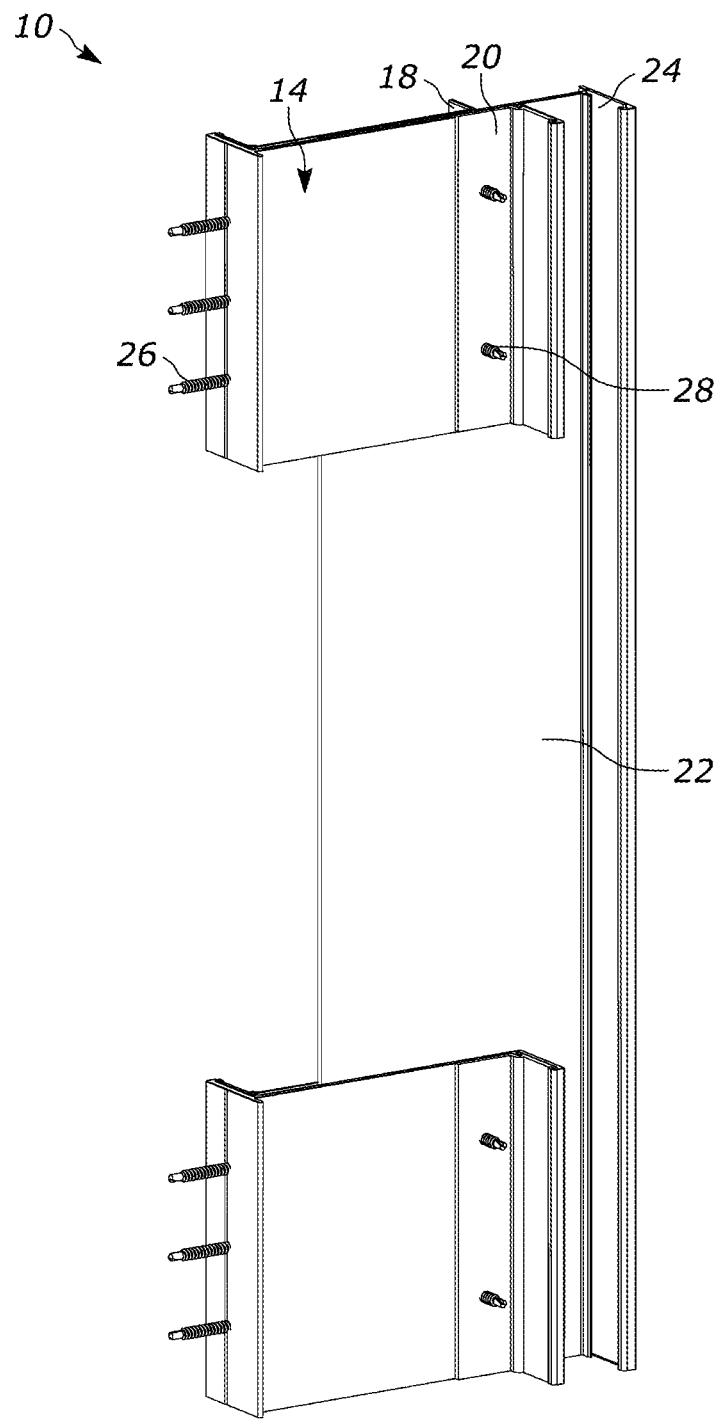
FIG. 4 of the drawings is a back perspective view of the adjustable support system of the present disclosure.
Figure 5:
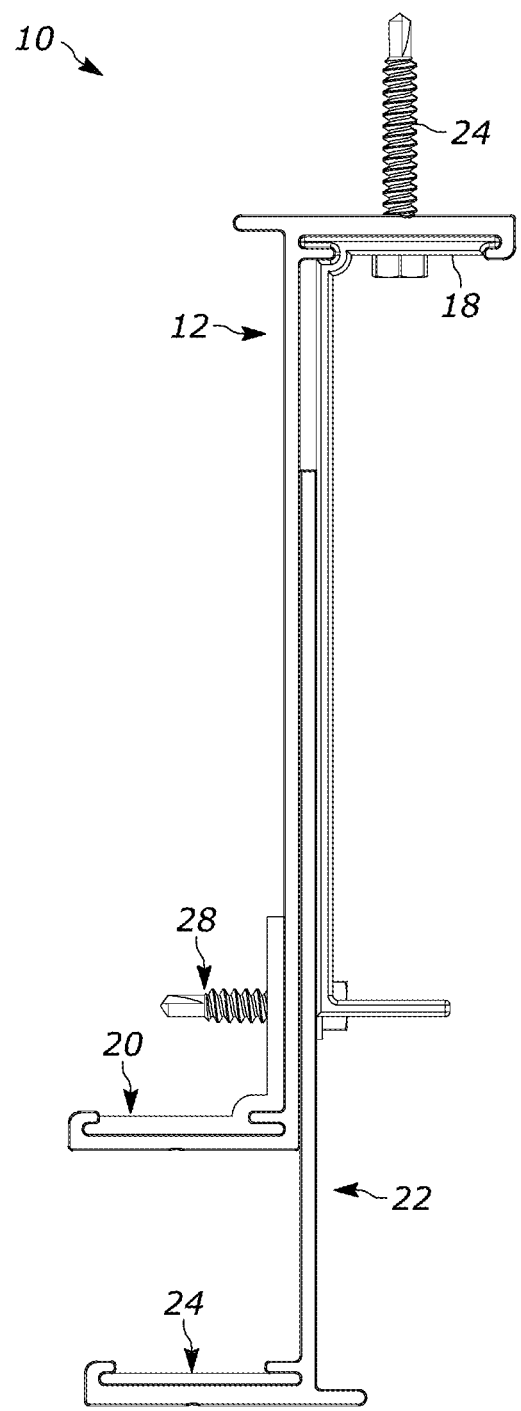
FIG. 5 of the drawings is a side elevational view of the adjustable support system of the present disclosure.

An exemplary wall assembly is shown in FIGS. 1 and 2. Such a configuration shows multiple fully assembled adjustable support systems in operation. One such assembled adjustable support system is shown in FIGS. 3 and 4. In the configuration shown, a pair of base bracket members 14a and 14b are assembled with the base mounting member 16, the clip members 18, and the distal mounting member 20 (to form a fully assembled base bracket system assembly) and positioned in a spaced apart configuration.

To assemble such a structure, a base bracket is provided. Once provided, the distal mounting member is slidably coupled to the second end wall 74 by slidably moving the distal slot engaging member into the channel 88 of the second end wall. Such a position places the support arm 162 into overlying abutment with the second side of the body wall 60.

A clip member is slidably coupled to the first end wall by slidably attaching the base bracket member coupling into the channel 46 of the first end wall. Once positioned, the base mounting member 16 is slid into the channel 46 of the first end wall 30. Finally, a second clip member 18 is slidably positioned within the channel in a similar manner as the first so as to sandwich the base mounting member between the two clip members.

With reference to FIGS. 14 through 18 and FIG. 1, the fully assembled base bracket members (and associated components) are coupled to a substrate. In particular, fasteners are extended through the base mounting members 16a, 16b and the first end walls 30a, 30b of the base bracket members 14a, 14b and into the substrate 300. The two brackets are generally spaced apart and generally positioned so that the base wall of each is coplanar.

Next, the outer bracket 22 is assembled by slidably positioning the distal coupling member into the channel of the outer end wall of the outer bracket. Once assembled, the outer bracket is coupled to each of the base bracket members 14a, 14b. In particular, the spanning wall is directed into the space between each of the clip members and the associated first sides of the body walls of the base bracket members. Due to the position of the clip members relative to the first side of the base and the spacing therebetween the clip members bias the outer bracket against the first side of the body wall so as to limit slidable movement therebetween (while allowing for repositioning with the application of some force). As such, the user can position the outer bracket between the clip members and the body wall, whereupon release the orientation is maintained by way of the biasing action of the clip member. It is contemplated that a light tack adhesive may be utilized to likewise maintain the position of the components, or, a high friction surface is likewise contemplated.

Advantageously, the position of the outer bracket can be modified relative to one of the two brackets to allow for compensation of flaws in the substrate. For example, whereas the substrate may be uneven or may be slightly oblique relative to a vertical surface, the outer bracket can be manipulated so that the distal coupling member is substantially vertical. This may also compensate for undulations in the substrate. It will be understood that the same adjustment can be repeated throughout a wall system such that undulations in a substrate outer surface nevertheless allows for a uniform outer cladding. As such, it will be understood that the outer end wall of the outer bracket may be oblique to the second end wall, due to the variation of the substrate and the desired position of the cladding. At the same time, the spanning wall of the outer bracket and the body wall of the base bracket member may be overlying each other and in parallel planes.

Once the outer bracket is positioned as desired, fasteners can be driven through the spanning wall of the outer bracket 22 into and through the base wall, and, eventually into the support arm positioned on the opposite side of the base wall from the spanning wall. This fastening can be repeated until one or multiple fasteners are extended through each of the body walls of each of the base bracket members.

This procedure can be repeated over and over again (i.e., 14c, 14d, 22b) until the full wall is formed. It is contemplated that a single outer bracket may interface with well in excess of two base bracket members. It is further contemplated that the outer brackets may be positioned in an end to end fashion with a base bracket member spanning between the outer bracket and the substrate at repeated intervals, such as, for example, between 6 inches and 24 inches. Of course, other configurations are likewise contemplated, as are other spans between different base bracket members.

Once fully installed, a cladding assembly may be coupled to the outer end wall through fasteners. For example, a cladding sheet may be attached directly to the outer end wall by directing fasteners through the outer end wall and through the distal coupling member, as is shown in FIG. 1.

In other configurations, such as the configuration of FIG. 2, horizontal rails, such as rails 330 may couple adjacent vertically oriented outer brackets. Subsequently, a cladding sheet may be coupled to the rails 330 so as to be indirectly coupled to the outer bracket. In such configurations, an outer bracket may be sized to correspond to a base bracket and there may be one to one correspondence of base bracket members to outer brackets. In such a configuration, the structure can come fully assembled, wherein the user merely has to utilize fasteners to fasten the bracket to the substrate and, upon adjustment of the outer bracket, the use can utilize fasteners to fix the outer bracket to the base bracket. Thus, the user is not required to assemble any structure at the jobsite. Of course, in other configurations, the user can be provided with the individual components for assembly at the job site.

Insulation may be positioned between adjacent rows of vertically spaced apart adjustable support systems. In such configurations, it is desirable that the distal flanges 124 of the clip members interface with the insulation to facilitate retention thereof, and to preclude relative movement of the insulation relative to the substrate, the cladding assembly and the adjustable support system.

With respect to dimensions, it is contemplated that the body wall may be, for example, between 3 and 6 inches in width, wherein the outer brackets can be adjustable from a first proximate position, wherein the distal coupling member and the second end wall substantially abut to a positione wherein the two are spaced apart such that the spanning wall of the outer bracket and the body wall overlap a minimal amount (such as for example 1.5 inches or more or less). As such, wherein the base bracket member has a width of 6 inches, the total assembled width of the combination of the base bracket member and the outer bracket can be 10.5 inches, which allows for a 1.5 inch overlap. It is likewise contemplated that the projecting arm has a length which is 1.15 inches shorter than the width of the body wall so as to preferably preserve a spacing from the second end wall of the base bracket member. In other instances, the spanning wall may have a width that is greater than the body wall such that even in a collapsed configuration, the second end wall is spaced apart from the outer end wall of the outer bracket.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An adjustable support system comprising:
a base bracket member having a first end wall structurally attachable to a substrate, a body wall extending outwardly from the first end wall at an inner edge thereof, the body wall terminating at an outer edge;
at least one clip member having a projecting arm extending from a region proximate the inner edge of the base bracket and overlying a portion of the body wall; with the projecting arm being biased against the body wall;
an outer bracket comprising a spanning wall with an inner side and an outer side, with an outer end wall extending from the outer side of the outer bracket,
wherein, the spanning wall of the outer bracket is slidably positionable between the body wall of the base bracket member and the at least one clip member, whereupon the body wall and the at least one clip member sandwich the spanning wall therebetween, with the cooperation of the body wall and the at least one clip member applying a force against the spanning wall.

2. The adjustable support system of claim 1 further comprising at least one fastener coupling the spanning wall to the body wall.

3. The adjustable support system of claim 1 wherein the at least one clip member is attached to the first end wall.

4. The adjustable support system of claim 3 wherein the at least one clip member is slidably mountable along the first end wall.

5. The adjustable support system of claim 4 wherein the first end wall further includes a channel disposed on an outward side thereof.

6. The adjustable support system of claim 1 wherein the base bracket further includes a second end wall opposite the first end wall.

7. The adjustable support system of claim 1 wherein the at least one clip member comprises a pair of clip members.

8. The adjustable support system of claim 1 wherein the projecting arm terminates short of the outer edge of the first end wall.

9. The adjustable support system of claim 1 wherein the body wall is substantially perpendicular to the first end wall.

10. The adjustable support system of claim 9 wherein the base bracket member comprises a polymer with fiber reinforcement.

11. The adjustable support system of claim 1 whereupon assembly, the outer end wall extends in the direction of the body wall so as to extend over the outer edge thereof.

12. The adjustable support system of claim 1 wherein the outer bracket is positionable relative to the base bracket member so that the first end wall and the outer end wall are oblique relative to each other, while the spanning wall and the body wall are parallel to each other.

13. A wall comprising:
a substrate having an outer surface;
a first base bracket system assembly and a second base bracket assembly, each base bracket assembly having
a base bracket member having a first end wall structurally attachable to a substrate, a body wall extending outwardly from the first end wall at an inner edge thereof, the body wall terminating at an outer edge;
at least one clip member having a projecting arm extending from a region proximate the inner edge of the base bracket and overlying a portion of the body wall; with the projecting arm being biased against the body wall;
at least one outer bracket member having a spanning wall and an outer end wall,
wherein the spanning wall of the at least one outer bracket is slidably positionable between the base bracket member and the at least one clip of at least one of the first base bracket system and the second base bracket system;
wherein the first end wall of the base bracket member is attached to the substrate.

14. The wall of claim 13 wherein a cladding is attached to the second end wall opposite the substrate.

15. The wall of claim 13 further comprising insulation positioned between the substrate and the cladding.

* * * * *